Figure 1:
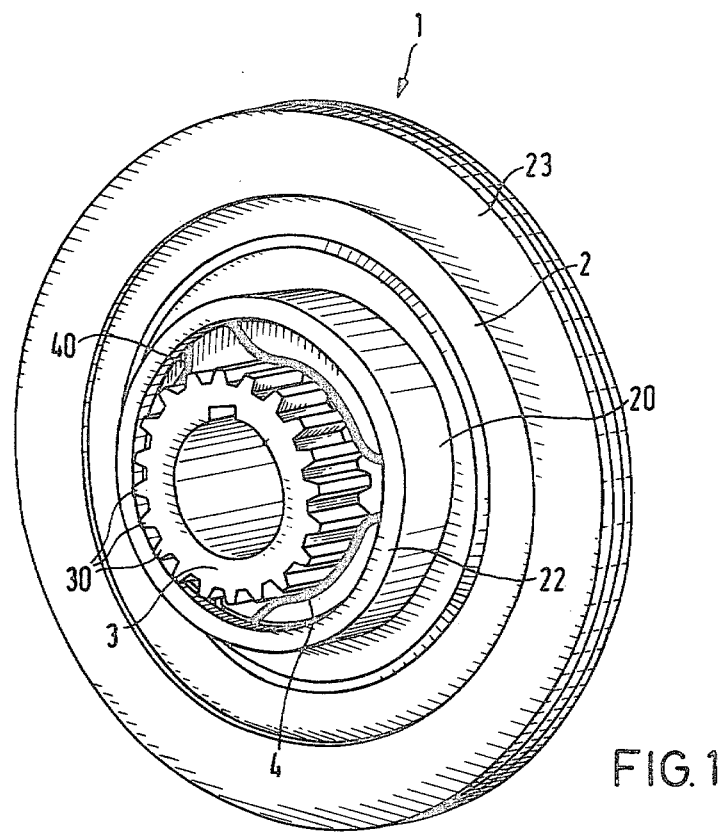

United States Patent [19]

Fischer

[11] 4,318,306

[45] Mar. 9, 1982

[54] CENTERING APPARATUS FOR TOOTHED DRIVES

[75] Inventor: Horst Fischer, Ubstadt-Weiher, Fed. Rep. of Germany

[73] Assignee: Sew-Eurodrive GmbH and Co. Süddeutsche Elektromotoren-Werke, Bruchsal, Fed. Rep. of Germany

[21] Appl. No.: 67,151

[22] Filed: Aug. 16, 1979

[30] Foreign Application Priority Data

Aug. 23, 1978 [DE] Fed. Rep. of Germany ... 7825113[U]

[51] Int. Cl.³ .......................... F16H 55/30; F16D 3/76
[52] U.S. Cl. ................................. 74/433; 403/359; 403/368; 403/372
[58] Field of Search ................ 74/431, 433; 64/14, 64/9 R; 403/365, 366, 372, 359, 13, 14, DIG. 4, DIG. 6; 192/70.2, 110 R, 110 B, 98; 188/218 XL; 285/24, 27, 133 R, 138

[56] References Cited

U.S. PATENT DOCUMENTS

| 2,789,364 | 4/1957 | Selleck | 403/DIG. 7 |
|---|---|---|---|
| 2,800,800 | 7/1957 | Dunn | 403/372 X |
| 3,197,216 | 7/1965 | Jackson | 403/359 X |
| 3,279,835 | 10/1966 | Krohm | 403/359 X |
| 3,374,015 | 3/1968 | Gies | 403/359 |
| 3,396,554 | 8/1968 | Westercamp | 64/9 R X |
| 3,438,660 | 4/1969 | Steiner | 403/368 X |
| 3,558,165 | 1/1971 | Lundergan | 403/359 X |
| 3,861,172 | 1/1975 | Symann | 64/9 R X |
| 3,978,945 | 9/1976 | Gardner | 403/372 X |
| 4,131,375 | 12/1978 | Fisher | 403/13 |
| 4,136,982 | 1/1979 | Sagady | 403/359 X |
| 4,165,194 | 8/1979 | Flower | 403/372 |
| 4,166,622 | 9/1979 | Rager | 403/366 X |
| 4,189,248 | 2/1980 | Sully | 403/359 X |
| 4,226,321 | 10/1980 | Ladin | 192/110 B |

FOREIGN PATENT DOCUMENTS

1073147 6/1967 United Kingdom ............... 403/372

Primary Examiner—C. J. Husar
Assistant Examiner—Conrad Berman
Attorney, Agent, or Firm—Craig and Antonelli

[57] ABSTRACT

A shaft centering device for assisting in the coaxial alignment of a drive pinion in relation to a driven member with which the pinion is selectively engageable by intermeshing of respective gear teeth thereon is proposed which comprises a spring ring element having radial projections thereto supported in the driven member and which bears on the gear teeth of the pinion about the periphery of such pinion.

5 Claims, 2 Drawing Figures

CENTERING APPARATUS FOR TOOTHED DRIVES

The invention relates to apparatus for use in centering coaxial toothed coupling parts and has more particular reference to the coaxial alignment of inner and outer parts having respective co-operable internal and external teeth thereon and which are capable of relative axial movement. A typical application of the invention is in the context of disc brake arrangements.

With engageable and disengageable toothed drive connections of all kinds there is often the problem that the clearance between opposing flanks of intermeshing teeth resulting from tolerances act to the detriment of the satisfactory operation of the connection. In practice this clearance causes disturbing chattering of the outer shaft part, even when the flank clearance is minimal. In addition, the clearance gives rise to a higher rate of wear than is experienced with driving mechanisms having a correctly guided, unalterably positioned driving part. In systems wherein rapid torque changes occur, for example in braking systems, these drawbacks occur most strongly.

With a view to avoiding the aforesaid problems, the inclusion of rubber O-rings has been proposed, but the spring force applied is basically insufficient and, in any event, the O-rings are particularly susceptible to temperature changes, becoming ineffective at high temperatures, and therefore having little application in the context of braking systems. The object of the present invention is to provide a means for the centering of toothed drives of the kind referred to whereby said disadvantageous effects of the flank clearance which must necessarily be provided are substantially eliminated.

According to the present invention there is proposed apparatus for assisting in the centering of drive coupling parts respectively having internal and external gear teeth movable into and out of engagement by relative axial movement between the parts, characterised by a spring ring which, in the engaged condition of the internal and external teeth, engages on the outer periphery of the external teeth, the said spring ring being firmly supported adjacent the end of the internal gear teeth in the structure providing such teeth and making contact with the outer said teeth about substantially the whole of the periphery thereof.

According to a preferred feature of the invention, that structure providing the internal teeth includes a cylindrical hub, the internal teeth being axially spaced relative to and inwardly of an end thereof and the spring ring being located in the wall of the bore of the hub directly adjacent the internal teeth. By means of the spring ring an inner driving part, for example, a drive pinion, is held in accurate axial alignment with an outer driven part, so that the changing of the flank clearance between the outer and inner teeth is practically substantially eliminated and thus noise and wear are reduced to a minimum.

In a preferred embodiment, the spring ring includes a plurality of outwardly extending projections arranged at equal spacing about the periphery of the ring and lying in the plane thereof, the projections being engageable with that structure providing the internal teeth. The spring ring conveniently has at least three bent-out projections but their number should also not be substantially higher.

For ease of manufacture, the hub has a groove in the internal wall thereof, which said groove lies in a plane perpendicular to the axis of the hub and extends throughout the full peripheral extent of the wall in such plane. The provision of a groove instead of individual recesses to receive the projections on the spring ring does allow of a progressive shift of the ring about the common axis of the drive and driven parts. Such progressive shift is, however, not disadvantageous as the function of the spring ring, namely, the centering of the inner drive part is not adversely affected in any way.

Figure 2:
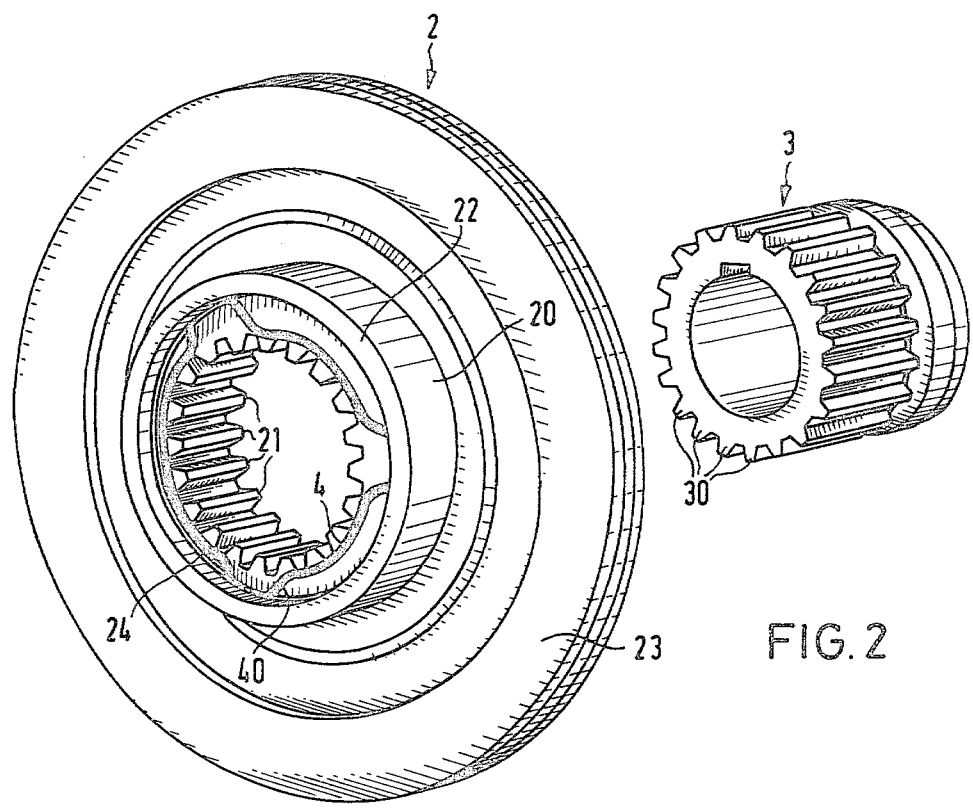

The invention will now be described further by way of example only, with reference to the accompanying drawings illustrating one embodiment thereof and in which:

FIG. 1 is a perspective view from one side of a toothed drive coupling having a centering device constructed in accordance with the invention applied thereto; and FIG. 2 is an exploded view of the arrangement shown in FIG. 1.

Referring now to the drawings, a drive coupling 1 comprises an internally toothed driven part 2 and an externally toothed drive part 3, for example, a drive pinion, drivingly connected with a suitable power input.

The driven part 2 (in the present instance a part of a brake disc arrangement) consists essentially of a cylindrical hub 20 having inner teeth 21, the teeth terminating short of the forward end 22 of the hub as seen in the drawing to define a stepped bore at such end. At its outer periphery, the hub carries a concentric flange 23, such flange 23 defining, in the case of the embodiment under consideration, an annular brake disc. A peripheral groove 24 is provided in the wall of the stepped forward end 22 of the hub 20 directly adjacent the annular end face of the internal tooth formation, the groove lying in a plane perpendicular to the axis of the hub and receiving radially outwardly projecting ears 40 of a spring ring 4 into engagement therewith thereby to locate and support the spring ring.

The spring ring 4 is of such dimensions as to contact the outer periphery of the external teeth 30 on the drive part 3 on engagement of such part with the hub, and thus serves to center the drive part relative to the hub.

I claim:

1. Apparatus comprising a drive coupling part having a bore with internal teeth, a drive coupling part having external teeth movable into and out of engagement with said internal teeth by axial movement between the coupling parts, and an endless spring ring having arcuate segments and at least three radially outwardly extending projections arranged at equal spacing about the periphery of the ring, each projection being located between adjacent pairs of arcuate segments; wherein, in the engaged condition of the internal and external teeth, said spring ring is supported with each of said projections engaged within a recess in said bore of the coupling part having internal teeth and with the arcuate segments making contact about substantially the whole periphery of the external teeth, each segment overlying the periphery of a plurality of said external teeth, whereby the coupling parts are centered and held in a manner restricting relative radial movement and chattering between the teeth thereof.

2. Apparatus according to claim 1, wherein the coupling part having the internal gear teeth comprises a brake disc and the coupling part having the external teeth comprises a drive pinion therefor.

3. Apparatus according to claim 1, wherein said projections are outwardly bent ear-like portions of said spring ring.

4. Apparatus according to claim 1 wherein the bore of the coupling part having the internal teeth is located within a cylindrical hub, the internal teeth being axially spaced relative to and inwardly of an end of said hub, and wherein the recess within which each of the projections is engaged is comprised by a groove located directly adjacent the internal teeth.

5. Apparatus as claimed in claim 4, characterised in that said groove in the said wall lies in a plane perpendicular to the axis of the hub and extends throughout the full peripheral extent of the wall in such plane.

* * * * *